United States Patent Office 3,365,305
Patented Jan. 23, 1968

3,365,305
AERATED FOOD PRODUCTS AND METHOD
Austin R. Hunter, La Mesa, Calif., assignor to Kelco Company, San Diego, Calif., a corporation of Delaware
No Drawing. Continuation-in-part of application Ser. No. 174,722, Feb. 21, 1962. This application Apr. 4, 1966, Ser. No. 539,654
4 Claims. (Cl. 99—139)

ABSTRACT OF THE DISCLOSURE

A composition for forming an aerated gelled food product, which composition contains a whippable dried comminuted emulsified edible lipid encased in a coating of edible, water soluble solids, about 1.25 to about 12 percent by weight of sodium phosphoalginate, from 0 to about 8 percent of an algin-gelatinizing calcium salt having a low solubility product, from 0 to about 12 percent of a calcium sequestering agent, and from 0 to about 10 percent of an edible acid. The above composition is employed in producing an aerated gelled food product through the addition of the said composition to a liquid which may contain an edible calcium source to form a mixture, and whipping air into the said mixture to form a foamed rigid structure in which the sodium phosphoalginate reacts with calcium, either present in the liquid or added with the composition, to form a calcium alginate gel.

---

This application is a continuation-in-part of my co-pending United States patent application Ser. No. 174,722, filed Feb. 21, 1962, and entitled, "Aerated Food Products," which application is now abandoned.

This invention relates to aerated food products of the type which form structurally rigid systems. Typical of such products are chiffon type pies, certain types of cheese cake, toppings for pies, cakes, similar bakery goods, and the like.

A large class of food products makes use of the attractive properties of a structurally rigid aerated system. Systems of this type are familiar as chiffon pies and other food product types mentioned above. The texture and mouth feel are improved, as a general rule, when using a whipped structure as distinguished from a non-whipped structure. Moreover, the attractiveness of the product is enhanced enormously. This is especially true with desserts, where the ability to form the product or the topping into a fixed shape is highly desirable. Methods generally used and heretofore available for the production of systems of this type have involved laborious processes. Also, the resulting product was not always structurally stable. A common example is the home production of whipped cream.

By "structurally rigid," I mean a system which stays where placed and is structurally competent so as not to flow or sag under its own weight. This permits cutting of the resulting food product which maintains its general conformation without sagging or running after being cut. It will be appreciated that this is a different type of system than is involved in a product which is merely thickened, as in the production of gravies, relatively flowable cream fillings, and the like. Not only should the food product be structurally rigid when first prepared, but it should retain this property in a stable fashion when stored at room temperature for a reasonable period of time. However, the food product would normally be stored under refrigeration to prevent bacterial spoilage, or would be refrigerated prior to consumption to enhance its eating properties. The storage period may be several days or even more, depending upon the intended use and marketing conditions for the product.

Previous attempts to prepare a structurally rigid whipped food product have been frustrated by the fact that the property of structural rigidity is oftimes incompatible with a whipped or aerated structure. To illustrate, in order for a food product to be whipped so as to entrap air or other inert gases within the product, it is necessary that the product material not be structurally rigid as in the case of a gelatin gel. Conversely, to have a structurally rigid food material, it is necessary that the material have demonstrable resistance to shear forces such that it maintains its shape. It can be seen that these properties are inconsistent for to attempt to whip a structurally rigid food product would destroy its body such that it would no longer be structurally rigid. By the same token, a material having the necessary lack of structural rigidity which permits whipping to entrap an inert gas, such as air, does not have the ability to maintain structural rigidity in its whipped form.

An object of the present invention is to produce a structurally rigid, whipped or aerated food product of simple formulation and ease of manufacture, which has good stability.

A further object is to provide a composition which, when added to a suitable liquid vehicle, may be readily whipped to form a structurally rigid whipped food product.

A still further object is to provide a method for producing a structurally rigid whipped food product.

Additional objects will become apparent from the description and claims which follow.

In accord with my invention, as illustrated by the examples which follow, I employ a mixture of a dried comminuted edible lipid in admixture with sodium phosphoalginate and optionally, a calcium source, and a gel-inhibiting or gel-retarding salt.

The term "lipid" is used in its usual chemical sense to include both fats and oils. Among the various edible lipids which I may employ are corn oil, cottonseed oil, safflower oil, soybean oil, coconut oil, peanut oil, sesame seed oil, olive oil, tea seed oil, sun flower seed oil, grape seed oil, and the like. Such oils may be employed either in their untreated or natural state or they may be partially or completely hydrogenated prior to use. Animal fats, such as lard, tallow, and butterfat, may also be employed. Further, naturally occurring solid vegetable lipids such as cocoa butter may be used. Of the above listed materials, the most preferable is cottonseed oil which has been hydrogenated to a softening point of 30–40° C. This material is preferred because of its ready availability, its pleasing flavor, and its general acceptability in the market.

The quantity of lipid employed is sufficient to form a whipped food product when admixed with a suitable liquid vehicle, such as water, milk, cream, fruit juices, and the like. In general, on a dry-mix basis, I employ from about 15 to about 97% of the dried comminuted emulsified edible lipid.

The dried comminuted emulsified edible lipid is prepared by first emulsifying a lipid in water with a suitable emulsifying agent or mixture of such agents. After the emulsion has been formed and the lipid has been dispersed in small particles as globules, e.g., having a size from 10 to 50 microns, the lipid is dried, for example by spray drying, to form a dried comminuted product. Suitable edible emulsifying agents which may be employed in forming aqueous emulsions of edible lipids are well known. For example, U.S. Patent No. 2,913,342 provides a good description of the various emulsifying agents commonly employed, and the disclosure of this patent is incorporated herein by reference. As shown in U.S. Patent No. 2,913,342, a dried comminuted emulsified edible lipid, as employed in my invention, is encapsulated in a matrix of hydrophilic edible solids.

I find it best to use an emulsified lipid made up as follows:

|  | Percent by weight |
|---|---|
| Hydrogenated cottonseed oil (30° C. congeal point) | 43.0 |
| Propylene glycol monostearate (approximately 45% mono-esters) | 16.0 |
| Hydroxylated soy lecithin | 1.0 |
| Sucrose | 34.0 |
| Sodium caseinate | 6.0 |

The above emulsion composition is taken from the disclosure of aforementioned United States Patent No. 2,913,342, which is incorporated herein by reference.

The sodium phosphoalginate employed in my composition is prepared by blending a sodium phosphate, such as trisodium phosphate, with a mixture of sodium alginate and water. The sodium phosphate and sodium alginate are blended wet, after which the mixture is dried and ground. According to this procedure, a minor quantity of trisodium phosphate, such as from 5 to 25 parts by weight, is incorporated into a major quantity, such as 95 to 75 parts by weight, of sodium alginate. This procedure is described in the U.S. Patent No. 2,485,934 to Arnold B. Steiner and in U.S. Patent No. 2,097,228 to Howard B. Lucas.

The quantity of sodium phosphoalginate which I employ is sufficient to form a gelled foamed product. The quantity of sodium phosphoalginate may, of course, be varied depending upon the rigidity of the gel desired. In general, I employ from about 0.5 to about 15.0% by weight of sodium phosphoalginate on a dry-mix basis. Preferably, I employ from about 1.25 to about 12% on a dry-mix basis.

The calcium source required for gelation of the sodium phosphoalginate may be supplied by a salt which is slightly soluble in water and/or which in aqueous solution is only slightly ionized. This material can be defined as an algin-gelatinizing calcium salt having a low solubility product. Examples of suitable calcium compounds are calcium gluconate, calcium tartrate, calcium citrate, and calcium lactate.

When an acid, as hereinafter defined, is employed in my composition, I can employ insoluble calcium salts which go into solution and ionize on contact with the acid. Illustrative of such salts are tricalcium phosphate, dicalcium phosphate, and calcium carbonate.

Suitable quantities of a calcium salt are from 0 to about 8.0% on a dry-mix basis. The presence of a calcium salt is not required if the food product being prepared contains calcium ions in some natural form. For example, if the liquid vehicle employed is milk, there is generally no need to provide an additional source of calcium ions in the form of a calcium salt as defined above. Likewise, if milk solids are contained as a food ingredient in the whipped food product, the milk solids will provide a source of calcium for gelatinizing the sodium phosphoalginate, thereby making it unnecessary to add a source of calcium in the form of a calcium salt.

In some instances, I may also employ a gel-inhibiting or gel-retarding salt. The sodium phosphoalginate, in itself, is sufficiently buffered so that it does not react quickly with calcium ions to form an alginate gel. Thus, in certain instances, there will be no need to provide a gel-inhibiting or gel-retarding salt as an additional ingredient. However, if desired, such materials may be employed to provide a buffering action in addition to that provided by the sodium phosphoalginate. Suitable quantities are from 0 to about 12% on a dry-mix basis. Typical of such materials are tetrasodium pyrophosphate, trisodium phosphate, sodium tripolyphosphate, sodium carbonate, potassium carbonate, sodium citrate, potassium citrate, or any of the condensed phosphates such as sodium hexametaphosphate. These materials may also be referred to as calcium sequestering agents and may be employed, for example, when the source of calcium ions is contained in the formulation in a natural form as, for example, found in milk, cream or cheese. The presence of the gel-inhibiting salt delays reaction between the calcium ions and the sodium phosphoalginate such that it can dissolve and the product can be whipped before gelation occurs.

A still further optional ingredient which I may employ in my composition is an edible acid. These ingredients may be employed if the food product is to have an acidic pH. Suitable acids are either fumaric or adipic acid. On the solution of either of these acids, the calcium salt is ionized to yield calcium ions which then react with the sodium phosphoalginate to form insoluble calcium alginate. Inasmuch as fumaric acid is a stronger acid than adipic acid, the speed of the reaction will not only depend upon the salt employed but also upon the nature and amount of the acid. The fumaric or adipic acid, when used, will be employed in a quantity sufficient to liberate the calcium such that it can react with the sodium phosphoalginate to form an insoluble calcium gel. Suitable quantities of acid are from 0 to about 10% on a dry-mix basis. The addition of the acid to my composition will, of course, give an acidic taste to the resulting food product.

It is the purpose of my invention to produce a combination of ingredients that can be added in one step to a cold liquid vehicle which is then whipped to form a structurally rigid whipped food product. Thus, I prefer to pre-mix all of the ingredients, i.e., the sodium phosphoalginate, the comminuted emulsified edible lipid, and the optional ingredients including a calcium salt, an additional buffering or sequestering agent, and an edible acid such as adipic or fumaric acid. These ingredients are then dispersed in a suitable liquid vehicle, such as water, milk, cream, fruit juices, and the like. The resulting dispersion is then whipped to beat in air or any other suitable non-toxic inert gas such as nitrogen, nitrous oxide and the like. The beating or whipping may be accomplished by any suitable means, such as an egg beater, to form a structurally rigid foamed product.

The food product can contain other food ingredients which are usual and appropriate to the particular food product concerned. Other ingredients can, for example, include milk or cream, cheese, sugar, starch, fruit, fruit juices, nuts, food flavors, food colors and the like. The liquid vehicle, as referred to above, may contain water as the sole liquid, or may contain mixtures of water and fruit juices, or may contain milk, cream, or mixtures thereof, or mixtures of their dried solids with water. Cheese may be incorporated and, most commonly, the cheese employed is known as baker's cheese which is a white material not unlike ricotto or hoop cheese. The baker's cheese may be dried and may be incorporated as part of the dry mix. If the food product is of the dessert type, sugar will generally be incorporated to give sweetness; however, dessert products of the so-called "dietetic" type may exclude sugar and use instead a sweetening agent such as sodium cyclamate or saccharin. Quasi-sugars such as sorbitol may also be included.

Where the nature of the food product permits or requires, fresh fruit such as peaches, apricots, or raspberries may be employed. Likewise, dried fruits such as currents, raisins, and the like or glazed fruits such as citron, sugared orange peel, candied cherries, and the like may be included. Also, nuts such as walnuts, almonds, pistachio nuts, etc., may be employed. Still other ingredients would include food flavors such as vanilla, lemon extract, almond extract, and various synthetic and artificial flavors. Likewise, various synthetic and artificial flavors may be employed and also food colors including, for example, caramel, cochineal, saffron, and chlorophyll may be used. In short, any of the federally approved food colors of synthetic nature may be included. In some instances, as set forth previously, it may also be desirable to include edible acids including, for example, fumaric and adipic acid.

To further illustrate my invention, there are presented the following examples in which all parts and percentages are by weight unless otherwise indicated.

*Example I*

| | Percent |
|---|---|
| Sodium phosphoalginate | 1.73 |
| Wip-Treme 1750 | 96.55 |
| Tetrasodium pyrophosphate | 0.86 |
| Vanillin | 0.86 |
| | 100.00 |

Wip-Treme 1750 is an emulsified edible lipid product containing hydrogenated vegetable shortening, sugar, corn syrup solids, sodium caseinate, diglycerides, and monoglycerides, glyceryl lactoplamitate, salt, algin, sodium phosphate, dextrin, certified artificial color, and a mixture of betahydroxy anisole and beta-hydroxy toluene, and citric acid in propylene glycol to improve stability. This material is supplied by Beatrice Foods Company. The material was employed in a number of the following examples, and, for purposes of brevity, its description will not be repeated elsewhere. Fifty-nine grams of the blended powder as above are mixed with ½ cup cold fresh milk and whipped at high speed for 4 to 5 minutes with an electric mixer in a one-quart mixing bowl. A stable topping of attractive appearance and exhibiting a rigid structure is obtained.

*Example II*

| | Percent |
|---|---|
| Sodium phosphoalginate | 6.98 |
| Adipic acid | 4.33 |
| Tetrasodium pyrophosphate | 1.31 |
| Wip-Treme 1750 | 87.00 |
| Lemon flavor (powder) | 0.35 |
| Yellow color | 0.03 |
| | 100.00 |

The above ingredients were dry blended and 57.45 grams of the resulting powder was added to 1 cup of cold milk. This mixture was whipped in a one-quart mixing bowl with an electric mixer at high speed for 4–5 minutes. One-half cup of sugar was added and mixing was continued for 1 minute longer. The whipped material was then poured into a suitable container and refrigerated to give a whipped lemon dessert or chiffon pie filling.

*Example III*

| | Percent |
|---|---|
| Sodium phosphoalginate | 4.450 |
| Tetrasodium pyrophosphate | 1.950 |
| Adipic acid | 2.448 |
| Lemon flavor (powder) | 0.111 |
| Cheese cake flavor (powder) | 0.111 |
| Wip-Treme 1750 | 52.000 |
| Dried baker's cheese | 38.930 |
| | 100.000 |

The above ingredients are dry blended and 90.0 grams of the resulting powder are dispersed in 1 cup of cold milk in a one-quart mixing bowl. After whipping at the highest speed for 4–5 minutes, ⅓ cup sugar is added and mixing is continued for 1 more minute. The whipped material is placed in a suitable container, such as a pie shell, and refrigerated to chill to yield a cheese pie filling.

*Example IV*

An instant lemon chiffon pie filling was prepared by mixing the following ingredients in the stated proportions:

| | Amount, gms. | Percent |
|---|---|---|
| Sodium phosphoalginate | 3.50 | 5.100 |
| Tetrasodium pyrophosphate (anhydrous powder) | 2.75 | 4.000 |
| Fumaric acid (purified powder) | 1.95 | 2.850 |
| Lemon flavor | 0.25 | 0.365 |
| F.D. & C. (Food, Drug and Cosmetic) Yellow #5 | 0.015 | 0.022 |
| Wip-Treme 1750 | 50.00 | 73.063 |
| Non-fat milk solids | 10.00 | 14.600 |
| | 68.465 | 100.000 |

The above ingredients, after being dry-mixed, were added to 1 and ½ cups of cold milk contained in a small mixing bowl of one-quart size. The material was mixed at low speed for 1 minute while scraping down the sides of the bowl during this period of time. The mixer speed was then adjusted to medium and mixing was continued for 3 minutes. Following this, ½ cup of sugar was added and mixing was continued for an additional minute at medium speed. The material was then poured into a pre-baked pie shell and refrigerated and was ready to eat in about 1 hour. The product is an excellent eating product, that can be served as a pudding, a pie filling, a frozen desert, a mousee, and the like.

*Example V*

An instant whole milk dessert mixture was prepared by dry blending the following ingredients in the following proportions:

| | Amount, gms. | Percent |
|---|---|---|
| Sodium phosphoalginate | 4.00 | 7.05 |
| Tetrasodium pyrophosphate (anhydrous powder) | 1.00 | 1.76 |
| Adipic acid, food grade | 2.48 | 4.37 |
| Dry imitation lemon flavor | 0.20 | 0.35 |
| F.D. & C. Yellow #5 | 0.02 | 0.04 |
| Wip-Treme 1750 | 49.00 | 86.43 |
| | ¹ 56.70 | 100.00 |

¹ 2 oz.

After adding the dry blended ingredients to 1 cup of cold milk, the material was whipped at a high speed for 4 minutes. There was then added ½ cup of sugar and whipping was continued for another minute. The material was placed in a pre-baked pie shell and refrigerated and was ready to eat in about 1 hour. The whipped dessert is quite rich and tasty and it can be consumed either in the form of a frozen dessert, a pie filling, as illustrated, or as a pudding.

*Example VI*

The following ingredients were dry blended in the proportions indicated:

| | Grams |
|---|---|
| Sodium phosphoalginate | 4.00 |
| Tetrasodium pyrophosphate | 1.00 |
| Adipic acid | 2.48 |
| Wip-Treme 1750 | 49.00 |

Flavoring to suit.
Coloring to suit.

These ingredients, in the form of a dry blended mix, were added to 1 cup of cold milk and the mixture was whipped at high speeds for 4 minutes. One-half cup of sugar was then added and whipping was continued for an additional minute. The whipped dessert was then placed in a refrigerator and was ready to eat in about 1 hour.

In forming an acid-type whipped dessert, as illustrated in Example VI, the relative quantities of ingredients employed can be varied in the following proportions:

Sodium phosphoalginate—about 1 to about 8 gms. and preferably from about 2 to about 6 gms.
Tetrasodium pyrophosphate—about 0.5 to about 7 gms. and preferably from about 0.75 to about 3 gms.
Adipic acid—about 1 gm. to about 6 gms. and preferably from about 1.75 to about 5 gms.
Wip-Treme 1750 (or equivalent edible lipid whipping agent)—about 25 to about 75 gms. and preferably from about 30 to about 60 gms.

Moreover, in place of adipic acid, I can employ fumaric acid. Inasmuch as fumaric acid is a stronger acid than adipic acid, I generally employ less of the fumaric acid. For example, I can employ 1.95 gms. of fumaric acid as a substitute for the 2.48 gms. of adipic acid shown in Example VI. When employing fumaric acid, the amount employed can range from about 0.5 to about 4.0 gms. and preferably from about 1.0 to about 3.0 gms. in the dry mix.

*Example VII*

The following ingredients were dry blended in the following proportions to form a dessert mix:

| | Amount, gms. | Percent |
|---|---|---|
| Sodium phosphoalginate | 4.00 | 4.70 |
| Tetrasodium pyrophosphate (anhydrous powder) | 0.70 | 0.82 |
| Calcium gluconate (U.S.P. Powder) | 3.00 | 3.54 |
| Vanilla flavor | 0.10 | 0.12 |
| Salt | 0.50 | 0.59 |
| Cocoa | 15.00 | 17.63 |
| Wip-Treme 1750 | 50.00 | 58.80 |
| Sugar | 11.70 | 13.80 |
| | [1] 85.00 | 100.00 |

[1] 3 oz.

The above dry blended mix (85.00 gms.) was added to 1 cup of cold milk and whipped at high speed with an electric mixer for 4–5 minutes. One-half cup of sugar was then added and whipping was continued for an additional minute. Following this, the whipped dessert was placed in a pre-baked pie shell and refrigerated and was ready to eat after being thoroughly chilled. In addition to being employed as a pie filling, the dessert can be consumed as a pudding.

*Example VIII*

The following ingredients were mixed in the stated proportions to form a dry blended strawberry dessert mix:

| | Amount, gms. | Percent |
|---|---|---|
| Sodium phosphoalginate | 4.00 | 7.05 |
| Tetrasodium pyrophosphate (anhydrous powder) | 1.00 | 1.76 |
| Adipic acid, food grade | 2.48 | 4.37 |
| Imitation strawberry flavor | 0.20 | 0.35 |
| F.D. & C. Red #2 | 0.005 | 0.01 |
| Wip-Treme 1750 | 49.18 | 86.46 |
| | [1] 56.70 | 100.00 |

[1] 2 oz.

The above dry blended ingredients were added to 1 cup of cold milk and whipped at high speed for 4 minutes. Thereafter, ½ cup of sugar was added and whipping was continued for 1 minute longer. The whipped dessert was then placed in a pre-baked pie shell and refrigerated and was ready to eat in about 1 hour. In addition to being employed as a pie filling, the whipped dessert may be consumed as a pudding or can be served as a frozen dessert.

*Example IX*

The following ingredients were mixed in the stated proportions to form a neutral vanilla chiffon dessert mix:

| | Grams |
|---|---|
| Sodium phosphoalginate | 4.00 |
| Tetrasodium pyrophosphate | 0.70 |
| Calcium gluconate | 1.50 |
| Vanilla flavor | 0.30 |
| F.D. & C. Yellow #5 | 0.02 |
| F.D. & C. Yellow #6 | 0.005 |
| Wip-Treme 1750 | 50.175 |
| | [1] 56.700 |

[1] 2 oz.

Two ounces of the above dry blended mix were added to 1 cup of cold milk and whipped for about 4 minutes at high speed. Thereafter, ½ cup of sugar was added and whipping was continued for an additional minute. After refrigeration, the chiffon dessert was ready to eat in about 1 hour.

*Example X*

The following ingredients were mixed in the following proportions to form a neutral type chocolate whipped dessert mix:

| | Grams |
|---|---|
| Sodium phosphoalginate | 4.00 |
| Tetrasodium pyrophosphate | 0.70 |
| Calcium gluconate | 3.00 |
| Wip-Treme 1750 | 50.00 |
| Cocoa | 15.00 |
| Flavoring to suit. | |
| Coloring to suit. | |

The above dry blended mix was added to 1 cup of cold milk and whipped at high speed for 4 minutes. One-half cup of sugar was then added and whipping was continued for 1 minute. After refrigeration, the whipped chocolate dessert was ready to eat in about 1 hour.

The quantities of ingredients employed in forming the whipped chocolate dessert of Example X can be varied in producing a dessert product. To illustrate, the ingredients can be varied in the following relative proportions:

Sodium phosphoalginate—about 1 to about 6 gms. and preferably from about 2 to about 5 gms.
Tetrasodium pyrophosphate—about 0.20 to about 1.50 gms. and preferably from about 0.25 to about 1.25 gms.
Calcium gluconate—about 1 to about 6 gms. and preferably from about 1.5 to about 3.5 gms.
Wip-Treme 1750 (or equivalent comminuted edible lipid whipping agent)—about 25 to about 90 gms. and preferably from about 30 to about 70 gms.

*Example XI*

An instant cheese pie filling mix was prepared by dry blending the following ingredients in the stated proportions:

| | Amount, gms. | Percent |
|---|---|---|
| Sodium phosphoalginate | 4.00 | 4.45 |
| Tetrasodium pyrophosphate | 2.50 | 2.77 |
| Adipic acid | 2.20 | 2.45 |
| Lemon flavor, powder | 0.10 | 0.11 |
| Cheese cake flavor, powder | 0.10 | 0.11 |
| Wip-Treme 1750 | 46.10 | 51.17 |
| E-Z Cheez, Type S | 35.00 | 38.94 |
| | 90.00 | 100.00 |

The cheese cake flavor is supplied by Dodge & Olcott, Inc., 180 Varick St., New York 14, N.Y., as Cheese Cake Flavor No. 16774. The E-Z Cheez is supplied by The Borden Co., Whitson Products Div., 350 Madison Ave., New York, N.Y.

The above dry blended ingredients were added to 1 cup of cold milk and mixed at medium speed with an electric mixer until the powder was thoroughly wetted. The mixer was then adjusted to high speed and whipped for an additional 4–5 minutes. Thereafter, ⅓ cup of sugar was added and whipping was continued for 1 minute more. The whipped cheese pie filling was then placed in a pre-baked pie shell and refrigerated until thoroughly chilled. The cheese pie was ready for consumption after about 1½ to 2 hours.

A modification of the instant cheese pie filling illustrated by Example XI employs the above ingredients in the stated amounts and additionally includes 4 gms. of "Golden Whip." This material is a mixture of spray dried egg yolk and protein modified skim milk and is supplied by The Borden Co., Whitson Products Div.

*Example XII*

An acid type of cheese flavored whipped dessert mix was prepared by dry blending the following ingredients in the stated proportions:

| | Grams |
|---|---|
| Sodium phosphoalginate | 4.00 |
| Tetrasodium pyrophosphate | 2.50 |
| Adipic acid | 2.20 |
| Wip-Treme 1750 | 46.10 |
| Dried baker's cheese | 35.00 |
| Flavoring to suit. | |
| Coloring to suit. | |

The above dry blended mix was added to 1 cup of cold milk and whipped at high speed for 4 minutes. One-third cup of sugar was then added and whipping was continued for an additional minute. Thereafter, the whipped dessert was refrigerated and was ready to eat in about 1 hour.

The whipped dessert illustrated in Example XII can be prepared while varying the proportions of the several essential ingredients as follows:

Sodium phosphoalginate—about 1 to about 5 gms. and preferably from about 1.5 to about 4.5 gms.
Tetrasodium pyrophosphate—0 to about 4 gms. and preferably from about 1 to about 3.5 gms.
Adipic acid—about 1.5 to about 4 gms. and preferably from about 2 to about 3.5 gms.
Wip-Treme 1750 (or equivalent comminuted emulsified edible lipid)—about 10 gms. to about 65 gms. and preferably from about 25 to about 55 gms.

The following example is an illustration of a food product made according to my invention which does not have a foamed or whipped consistency.

*Example XIII*

The following ingredients were dry blended in the stated proportions to form an instant chip dip base:

| | Grams |
|---|---|
| Sodium phosphoalginate | 5.90 |
| Tetrasodium pyrophosphate | 2.62 |
| Adipic acid | 3.62 |
| Sodium chloride | 2.62 |
| Beatreme 1612A | 19.67 |
| Beatreme 1038 | 26.25 |
| Spray dried non-fat milk solids | 39.40 |
| | 100.00 |

76.2 gms. of the above mix with optional flavorings added, if desired, was added to 1 cup of cold milk and mixed until throughly wetted. Mixing was continued until the mixture became smooth and creamy. The mixing time required when employing an electrical mixer was approximately 2–4 minutes, at slow or medium speed and approximately 1–2 minutes when employing an egg beater. The resulting product was rich in texture and provided a tasty appetizing chip dip.

In the foregoing example, the products Beatreme 1612A and Beatreme 1038 are identified as ingredients in the instant chip dip base. Beatreme 1612A is composed of hydrogenated shortening, buttermilk solids, diglycerides and monoglycerides, disodium phosphate and glyceryl lactopalmitate. Beatreme 1038 is composed of sour cream solids, gum arabic, citric acid and butylated hydroxyanisole and propyl gallate in propylene glycol.

Various uses for a product of the type described in Example XIII include use as a dip for potato chips, crackers, etc., or, for example, use as a cheese dressing for baked potatoes or other vegetables. Appropriate flavorings which may be included in a dip of this type include onion, cheese, chives, bacon, garlic, barbecue flavor, clams, dill, and the like. These flavorings would generally be incorporated into the dry chip dip base.

As illustrated by the foregoing examples, my invention has great application to the formulation of a variety of food products. The primary applications for my invention are in the area of whipped food products. My invention provides such products in a form having a suitable whipped fluffy texture and yet at the same time having the structural rigidity so desirable in a food product which is to be cut and served. An important feature of the food products formed according to my invention is the fact that they may be refrigerated or actually frozen without destroying their texture. Since many food products are served in a frozen state, this is an important characteristic for a food product. Many food products do not have this characteristic. When frozen, these products form ice crystals and concurrently lose their texture.

I have illustrated my invention by resort to a number of examples showing specific percentages, mixing conditions, temperatures and the like. It should be understood that these examples are only employed for purposes of illustration and should not be construed as limiting my invention, as defined in the following claims.

I claim:
1. The process of producing an aerated food product having structural rigidity which comprises the steps of forming a dry mix containing from about 15 to about 97 percent of a whippable dried comminuted emulsified edible lipid encapsulated in a matrix of hydrophilic edible solids, from about 1.25 to about 12 percent of a sodium phosphoalginate, from 0 to about 12 percent of a calcium sequestering agent and from 0 to about 10 percent of an edible acid, adding said dry mix to a liquid in the presence of an edible calcium salt to form a mixture, and whipping air into said mixture to form an aerated food product having a rigid calcium alginate gel structure resulting from reaction of said sodium phosphoalginate with said calcium source.

2. The process of claim 1 wherein said calcium source is present as a natural source of calcium in said liquid.

3. The process of claim 1 wherein said calcium source is an algin-gelatinizing calcium salt having a low solubility product, which calcium salt is present in said dry mix in an effective amount to form a calcium alginate gel with said sodium phosphoalginate ranging up to about 8 percent by weight of said dry mix.

4. An aerated food product produced according to the method of claim 1.

References Cited

UNITED STATES PATENTS

| 2,097,229 | 10/1937 | Lucas et al. | 99—136 |
| 2,808,337 | 10/1957 | Gibsen | 99—131 |
| 2,913,342 | 11/1959 | Cameron et al. | 99—139 X |
| 3,098,748 | 7/1963 | Noznick et al. | 99—139 X |

(Other references on following page)

OTHER REFERENCES

Gibsen et al.: "Algin-Versatile Food Improver," Food Engineering, vol. 27, October 1955, pp. 87–89.

Whistler et al.: "Industrial Gums," 1959, Academic Press, New York, pp. 76–77.

HYMAN LORD, *Primary Examiner.*

JOSEPH M. GOLIAN, A. LOUIS MONACELL, *Examiners.*

J. M. HUNTER, *Assistant Examiner.*